United States Patent
Lin et al.

(10) Patent No.: US 10,803,566 B2
(45) Date of Patent: Oct. 13, 2020

(54) METHOD FOR DYNAMICALLY ADJUSTING IMAGE CLARITY AND IMAGE PROCESSING DEVICE USING THE SAME

(71) Applicant: Acer Incorporated, New Taipei (TW)

(72) Inventors: Tzu-Chieh Lin, New Taipei (TW); Chen-Kang Su, New Taipei (TW)

(73) Assignee: Acer Incorporated, New Taipei (TW)

(*) Notice: Subject to any disclaimer, the term of this patent is extended or adjusted under 35 U.S.C. 154(b) by 160 days.

(21) Appl. No.: 16/210,000

(22) Filed: Dec. 5, 2018

(65) Prior Publication Data

US 2020/0090312 A1    Mar. 19, 2020

(30) Foreign Application Priority Data

Sep. 18, 2018  (TW) .............................. 107132812 A

(51) Int. Cl.
*G06K 9/40*    (2006.01)
*G06T 5/00*    (2006.01)
*G06K 9/62*    (2006.01)

(52) U.S. Cl.
CPC ............ *G06T 5/009* (2013.01); *G06K 9/6202* (2013.01); *G06T 5/003* (2013.01)

(58) Field of Classification Search
CPC ..................... G06T 5/009; G06T 5/003; G06T 2207/20192; G06K 9/6202; G06K 9/40
See application file for complete search history.

(56) References Cited

U.S. PATENT DOCUMENTS

| | | | | |
|---|---|---|---|---|
| 5,907,669 | A * | 5/1999 | Yoshiura | H04N 1/32502 358/1.1 |
| 7,283,683 | B1 * | 10/2007 | Nakamura | G06T 5/40 382/274 |
| 8,253,862 | B2 * | 8/2012 | Chen | H04N 1/58 348/625 |
| 2009/0087016 | A1 * | 4/2009 | Berestov | H04N 21/44008 382/100 |
| 2011/0069142 | A1 * | 3/2011 | Ali | H04N 21/6377 348/14.12 |
| 2014/0099034 | A1 * | 4/2014 | Rafati | G06K 9/00275 382/209 |
| 2014/0232820 | A1 * | 8/2014 | Ha | G06T 7/529 348/43 |

* cited by examiner

*Primary Examiner* — Samir A Ahmed
(74) *Attorney, Agent, or Firm* — JCIPRNET

(57) ABSTRACT

The disclosure provides a method for dynamically adjusting image clarity and an image processing device using the same method. The method includes: retrieving an image frame and searching for a predetermined object therein; evaluating a first sharpness of the predetermined object; if the first sharpness of the predetermined object is lower than a sharpness threshold, calculating a difference value between the first sharpness and the sharpness threshold; dividing the image frame into blocks and evaluating a risk value and an effect value of increasing a second sharpness of each block; inputting the difference value, the risk value, and the effect value to a classifying model to generate a clarity setting value; and adjusting a clarity of a display on showing the image frame based on the clarity setting value.

20 Claims, 3 Drawing Sheets

METHOD FOR DYNAMICALLY ADJUSTING IMAGE CLARITY AND IMAGE PROCESSING DEVICE USING THE SAME

CROSS-REFERENCE TO RELATED APPLICATION

This application claims the priority benefit of Taiwan application serial no. 107132812, filed on Sep. 18, 2018. The entirety of the above-mentioned patent application is hereby incorporated by reference herein and made a part of this specification.

BACKGROUND OF THE INVENTION

1. Field of the Invention

The present disclosure relates to an image processing method and an image processing device, and more particularly to a method for dynamically adjusting image clarity and an image processing device using the same method.

2. Description of Related Art

In the existing image display technology, the display can be controlled by software or firmware to change the clarity of the displayed image. However, the foregoing mechanisms mostly use only a single parameter to globally adjust the clarity of the displayed image of the display. In this case, if the dynamic range of the aforementioned parameter is too small (i.e., the adjustment range of the clarity is relatively small), the clarity of some local areas of the displayed image in the display may not be effectively improved. On the other hand, if an excessively large dynamic range (i.e., the adjustment range of the clarity is relatively large) is applied to the aforementioned parameter, some local areas of the displayed image in the display may be too sharp, which may lead to a weird visual effect. For example, for a local area essentially having high sharpness (e.g., those areas including objects such as grass, trees, and text), the local area may be significantly clearer and sharper than other areas in the display after the clarity is globally adjusted. In this case, the grass in the local area may appear to be too sharply defined, and the leaves may appear to be overly distinct with each other, which may cause the viewer to feel that there is an abnormally sharp area in the entire display. In other words, it is difficult to achieve a better display effect regardless of the use of a larger or smaller dynamic range.

However, if the image clarity is locally adjusted, it is necessary to effectively exclude those image areas that are prone to occur unnatural visual effects after adjustment or to find more effective adjustment parameters, otherwise the above-mentioned defects may still occur.

SUMMARY OF THE INVENTION

Accordingly, the present disclosure is directed to a method for dynamically adjusting image clarity and an image processing device that can be used to solve the above technical issues.

The disclosure provides a method for dynamically adjusting image clarity. The method includes: retrieving an image frame and searching for a predetermined object in the image frame; evaluating a first sharpness of the predetermined object if the predetermined object exists; calculating a difference value between the first sharpness of the predetermined object and a sharpness threshold if the first sharpness of the predetermined object is lower than the sharpness threshold; dividing the image frame into a plurality of blocks and evaluating at least one risk value and at least one effect value of increasing a second sharpness of each of the blocks; inputting the difference value, the at least one risk value, and the at least one effect value into a classifying model to generate a clarity setting value; and adjusting a clarity of a display on showing the image frame based on the clarity setting value.

The disclosure provides an image processing device. The image processing device includes a storage circuit and a processor. The storage circuit stores a plurality of modules. The processor is coupled to the non-transitory storage circuit and accessing the modules to perform the following steps: retrieving an image frame and searching for a predetermined object in the image frame; evaluating a first sharpness of the predetermined object if the predetermined object exists; calculating a difference value between the first sharpness of the predetermined object and a sharpness threshold if the first sharpness of the predetermined object is lower than the sharpness threshold; dividing the image frame into a plurality of blocks and evaluating at least one risk value and at least one effect value of increasing a second sharpness of each of the blocks; inputting the difference value, the at least one risk value, and the at least one effect value into a classifying model to generate a clarity setting value; and adjusting a clarity of the display on showing the image frame based on the clarity setting value.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
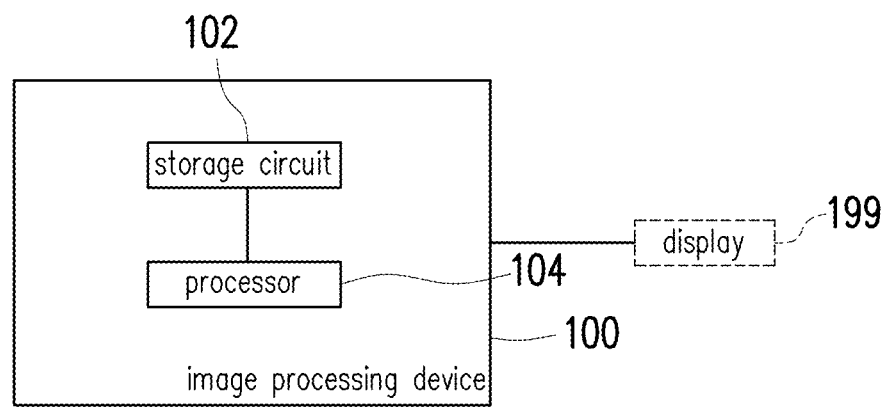
FIG. 1 is a functional block diagram of an image processing device according to an embodiment of the disclosure.

Reference will now be made in detail to the present preferred embodiments of the invention, examples of which are illustrated in the accompanying drawings. Wherever possible, the same reference numbers are used in the drawings and the description to refer to the same or like parts.

See FIG. 1, which is a functional block diagram of an image processing device according to an embodiment of the disclosure. In this embodiment, the image processing device 100 may be a smart phone, a personal computer (PC), a notebook computer, a netbook PC, a tablet PC, a television, game console, portable multimedia player, or other device that can display a screen for the user to watch.

As exemplarily shown in the embodiment of FIG. 1, the image processing device 100 includes a storage circuit 102 and a processor 104. The image processing device 100 is coupled to the display 199 to control the display 199 to display a desired image. The display 199 can be a liquid crystal display (LCD), a plasma display, a vacuum fluorescent display, a Light-Emitting Diode (LED) display, a Field Emission Display (FED), and/or other suitable types of displays, or other electronic devices having the above various display devices, which are not limited by the embodiments of the present disclosure.

The storage circuit 102 can be a memory, a hard disk, or any other component that can be used to store data, and can be used to record a plurality of code or modules. The processor 104 is coupled to the display 199 and the storage circuit 102, and can be a general purpose processor, a special purpose processor, a conventional processor, a digital signal processor, a plurality of microprocessors, or one or more microprocessors combined with digital signal processing cores, controllers, microcontrollers, Application Specific Integrated Circuits (ASICs), Field Programmable Gate Arrays (FPGAs), integrated circuits, state machines, processors based on Advanced RISC Machine (ARM), and the like.

Figure 2:
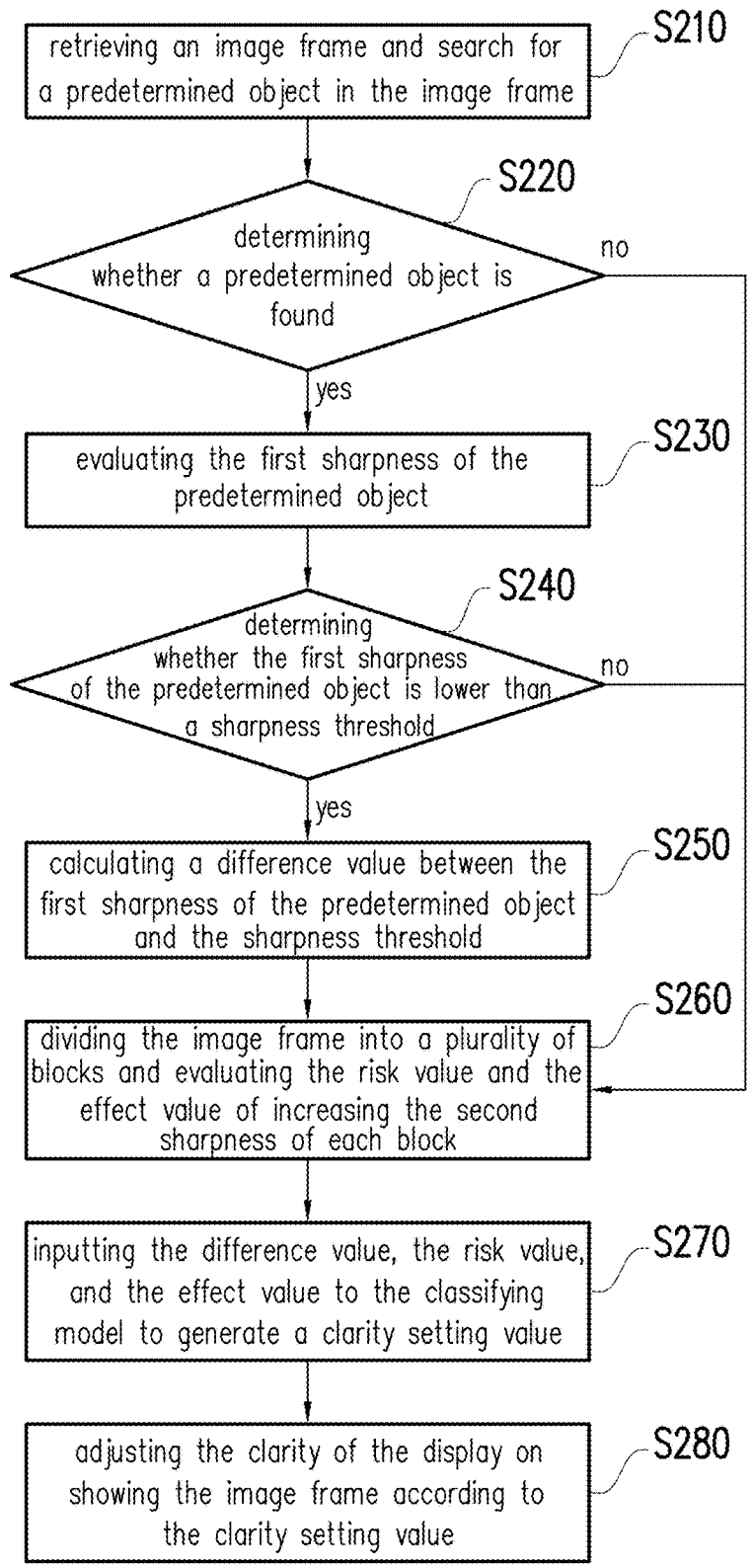
FIG. 2 is a flow chart of a method for dynamically adjusting image clarity according to an embodiment of the disclosure.
Figure 3:
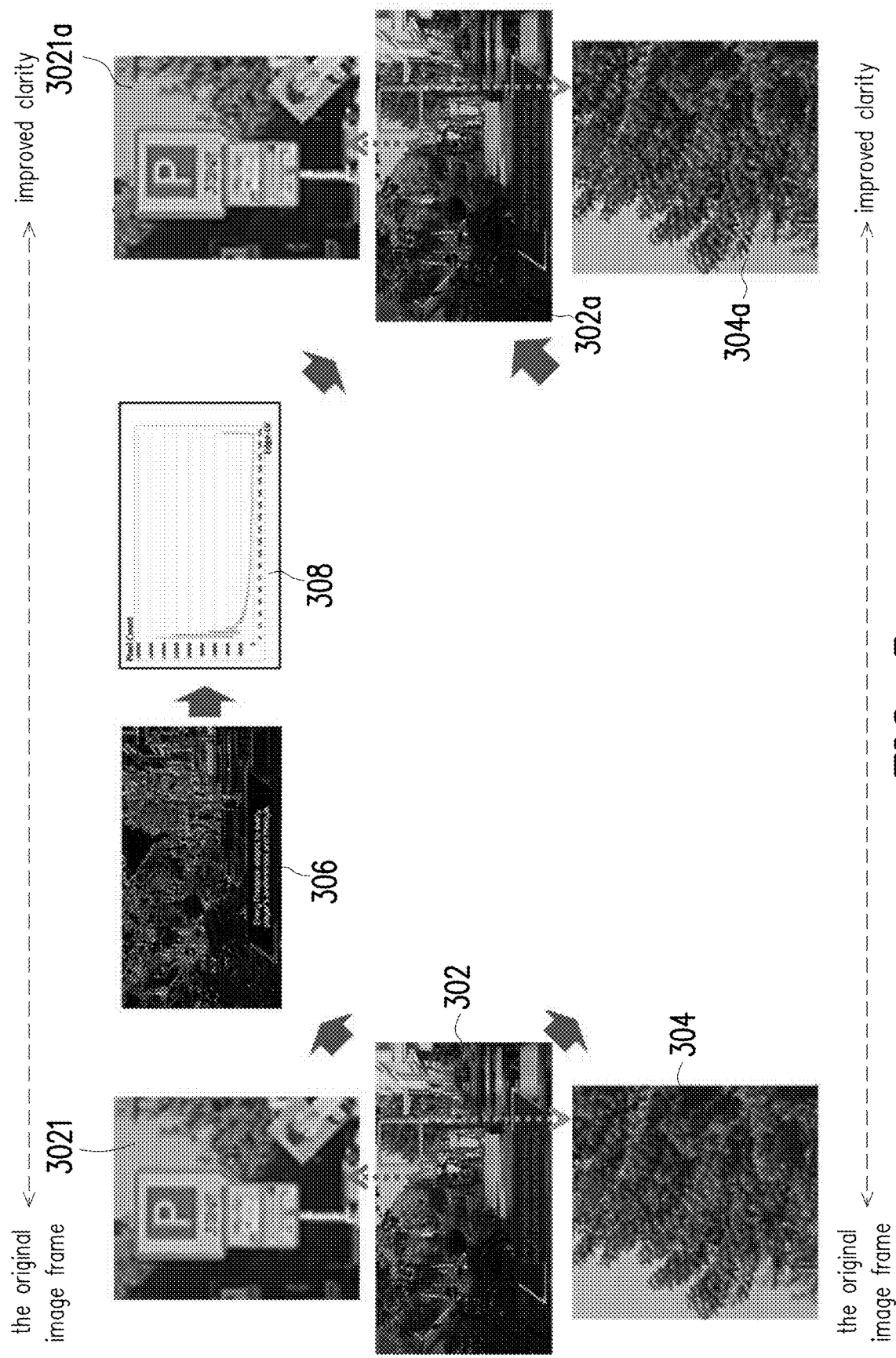
FIG. 3 is a schematic diagram of adjusting image clarity by applying the method of FIG. 2.

See FIG. 2 and FIG. 3, wherein FIG. 2 is a flow chart of the method for dynamically adjusting image clarity according to an embodiment of the present disclosure, and FIG. 3 is a schematic diagram of adjusting image clarity by applying the method of FIG. 2. The method of FIG. 2 can be performed by the image processing device 100 of FIG. 1, and the details of the steps of FIG. 2 will be described below with reference to FIG. 1 and FIG. 3.

Firstly, in step S210, the processor 104 may retrieve an image frame 302 and search for the predetermined object in the image frame 302. In an embodiment, the image frame 302 can be a static image or one of the frames of a video clip. Also, in various embodiments, the predetermined object can be an object that essentially has a higher sharpness (e.g., grass, tree, or text, etc.), and the processor 104 can find the predetermined object to be considered in the image frame 302 based on any known image recognition algorithms.

Thereafter, in step S220, the processor 104 may determine whether a predetermined object is found. For facilitating the following discussions, it is assumed in the following embodiments that the processor 104 finds only one predetermined object 304 (e.g., grass) in the image frame 302, but it is not intended to limit the possible embodiments of the present disclosure. In other embodiments, if the processor 104 can find a plurality of predetermined objects in the considered image frame, the processor 104 can still adjust the clarity of the image frame based on the following teachings.

Since the processor 104 has found the predetermined object 304 in the image frame 302, step S230 may be subsequently performed d to evaluate the first sharpness of the predetermined object 304. In this embodiment, the first sharpness of the predetermined object 304 is:

$$EdgeLV\ AVRG. = \frac{\sum_{EdgeLV1=0}^{255} EdgeLV1 \times PixelCount_{EdgeLV1}}{\sum_{EdgeLV1=0}^{255} PixelCount_{EdgeLV1}}, \quad (1)$$

where EdgeLV1 is an edge intensity value, which is between 0 and 255, and $PixelCount_{EdgeLV1}$ is a number of pixels whose edge intensity value is EdgeLV1 in the predetermined object 304. In this embodiment, the edge intensity value may be the brightness value of a pixel, so the $PixelCount_{EdgeLV1}$ is the number of the pixels whose brightness value is EdgeLV1 in the predetermined object 304. For example, if the EdgeLV1 is 20 and the $PixelCount_{EdgeLV1}$ is 10000, it means that the predetermined object 304 includes 10000 pixels and the brightness value of each of these pixels is 20.

In an embodiment, the processor 104 may perform edge detection on the image frame 302 to generate a grayscale map 306 of the image frame 302 and an edge intensity value distribution map 308. In the edge intensity value distribution map 308, the abscissa represents a pixel edge intensity value (e.g., a brightness value), and the ordinate represents the number of pixels. Next, based on the mechanism for generating the edge intensity value distribution map 308, the processor 104 can accordingly generate a similar edge intensity value distribution map (not shown) for the corresponding region of the predetermined object 304 in the grayscale map 306. In this edge intensity value distribution map, the abscissa corresponds to EdgeLV1 in Equation (1), and the ordinate corresponds to $PixelCount_{EdgeLV1}$ in Equation (1). Thereby, the processor 104 can calculate the first sharpness of the predetermined object 304 based on the Equation (1), but the disclosure is not limited thereto.

Moreover, in other embodiments, if the processor 104 finds a plurality of predetermined objects in the considered image frame, the processor 104 may calculate the first sharpness of each predetermined object based on the above teachings.

In an embodiment, if the processor 104 fails to find a predetermined object (for example, grass, tree or text) in the considered image frame, step S260 may be subsequently performed after step S220, the details thereof will be discussed later.

In step S240, the processor 104 may determine whether the first sharpness of the predetermined object 304 is lower than a sharpness threshold. If yes, the processor 104 can proceed to perform step S250, otherwise step S260 can be performed. In the present embodiment, the sharpness threshold (indicated by TH1) may be the average sharpness of other objects of the same type as the predetermined object 304. Since the predetermined object 304 of the present embodiment is assumed to be grass, TH1 may be the average sharpness of other grass-like objects, and may be retrieved based on a large amount of image data in advance, but the disclosure is not limited thereto.

If the first sharpness of the predetermined object 304 is lower than TH1, it represents that the image frame 302 may be an image with reduced image quality. Therefore, step S250 can be subsequently used to estimate the degree of sharpness reduction, which may be used as a reference for adjusting the clarity of the image frame 302.

In other embodiments, if there are multiple predetermined objects in the considered image frame, the processor 104 can determine whether all of the first sharpness of the predetermined objects are lower than TH1. If not, some of the predetermine objects may have a lower sharpness due to special image effects (e.g., depth of field (DOF) effects). Accordingly, the processor 104 can proceed to step S260. On the other hand, if not all of the first sharpness of the predetermined objects are lower than TH1, it means that the considered image frame may be an image with reduced image quality, so step S250 may be used to estimate the degree of sharpness reduction, which may be used as a reference for adjusting the clarity of the image frame 302.

In step S250, the processor 104 may calculate a difference value between the first sharpness of the predetermined object 304 and the sharpness threshold. In an embodiment, the difference value can be characterized as:

$$CV1 = |EdgeLV\ AVRG - TH1|, \quad (2)$$

but the disclosure may not be limited thereto.

In step S260, the processor 104 may divide the image frame 302 into a plurality of blocks and evaluate the risk value and the effect value of increasing the second sharpness of each block.

In an embodiment, the risk value may include a local risk value, which may be:

$$CV2 = \frac{\sum_{EdgeLV2=0}^{255} EdgeLV2 \times PixelCount_{EdgeLV2}}{\sum_{EdgeLV2=0}^{255} PixelCount_{EdgeLV2}}, \quad (3)$$

where EdgeLV2 is an edge intensity value, which is between 0 and 255, and $PixelCount_{EdgeLV2}$ is a number of pixels whose edge intensity value is EdgeLV2 in one of the blocks. That is, after dividing the image frame 302 into the blocks, the processor 104 can create a corresponding edge intensity value distribution map for each of the blocks. Based on the edge intensity value distribution map of each block, the processor 104 can use Equation (3) to calculate the local sharpness of each block and to characterize the local risk value of increasing the second sharpness of each block.

In an embodiment, the risk value may further include a global risk value, which may be:

$$CV3 = \frac{\sum_{EdgeLV3=0}^{255} EdgeLV3 \times PixelCount_{EdgeLV3}}{\sum_{EdgeLV3=0}^{255} PixelCount_{EdgeLV3}}, \quad (4)$$

where EdgeLV3 is an edge intensity value, which is between 0 and 255, and $PixelCount_{EdgeLV3}$ is a number of pixels whose edge intensity value is EdgeLV3 in the blocks. That is, after dividing the image frame 302 into the blocks, the processor 104 can create a corresponding edge intensity value distribution map for each block. Based on the edge intensity value distribution map of each block, the processor 104 can use Equation (4) to calculate the global sharpness of all blocks and to characterize the global risk value of increasing the second sharpness of each block.

In an embodiment, the effect value includes a local effect value, which may be:

$$CV4 = \frac{\sum_{EdgeLV4=1}^{254} EdgeLV4 \times PixelCount_{EdgeLV4}}{\sum_{EdgeLV4=1}^{254} PixelCount_{EdgeLV4}}, \quad (5)$$

where EdgeLV4 is an edge intensity value, which is between 0 and 255, and $PixelCount_{EdgeLV4}$ is a number of pixels whose edge intensity value is EdgeLV4 in one of the blocks. Similar to the teachings of the previous embodiments, after dividing the image frame 302 into a plurality of blocks, the processor 104 can create a corresponding edge intensity value distribution map for each of the blocks. Based on the edge intensity value distribution map of each block, the processor 104 may use Equation (5) to calculate the local sharpness of each block (without considering the pixels whose edge intensity values is 0 or 255), and accordingly characterize the local effect value of increasing the second sharpness of each block.

In addition, as can be understood from the above, although EdgeLV4 is between 0 and 255, in Equation (5), CV4 is calculated based only on EdgeLV4 other than edge intensity values 0 and 255 (i.e., 1 to 254). The reason for this is that for a pixel having an edge intensity value of 0, it already belongs to a smooth region (for example, a solid color region), so adjusting its sharpness does not substantially contribute to the visual effect. On the other hand, for a pixel having an edge intensity value of 255, since it is excessively sharp, if the sharpness is increased again, side effects such as an unnatural image effect may appear on the adjusted image. Therefore, the processor 104 may not consider pixels having edge intensity values of 0 and 255 in calculating the local effect value, but the present disclosure is not limited thereto.

In an embodiment, the above effect value may further include a global effect value, which may be:

$$CV5 = \frac{\sum_{EdgeLV5=1}^{254} EdgeLV5 \times PixelCount_{EdgeLV5}}{\sum_{EdgeLV5=1}^{254} PixelCount_{EdgeLV5}}, \quad (6)$$

where EdgeLV5 is an edge intensity value, which is between 0 and 255, and $PixelCount_{EdgeLV5}$ is a number of pixels whose edge intensity value is EdgeLV5 in the blocks. Similar to the teachings of the previous embodiments, after dividing the image frame 302 into a plurality of blocks, the processor 104 can create a corresponding edge intensity value distribution map for each of the blocks. Based on the edge intensity value distribution map of each block, the processor 104 can use Equation (6) to calculate the global sharpness of all the blocks (without considering the pixels with edge intensity values of 0 or 255), and accordingly characterize the global effect value of increasing the second sharpness of each block.

In addition, as can be understood from the above, although EdgeLV5 is between 0 and 255, in Equation (6), CV5 is calculated based only on EdgeLV5 other than edge intensity values 0 and 255 (i.e., 1 to 254), and the reason thereof can be referred to the relevant description of calculating the CV4, which would not be repeated herein.

In step S270, the processor 104 may input the difference value, the risk value, and the effect value to the classifying model to generate a clarity setting value. In various embodiments, the risk value may include the local risk value and/or the global risk value, and the effect value may include the local effect value and/or the global effect value.

In this embodiment, the classifying model may be implemented as a support vector machine (SVM), a neural network, or the like. Moreover, the classifying model can be trained through a certain amount of training data, and then through learning, what kind of clarity setting value should be used for the display 199 to adjust the clarity of the image frame under various combinations of different difference values, risk values and effect values for providing better visual effects while avoiding side effects such as unnatural effects can be learned.

Accordingly, in step S280, the processor 104 can adjust the clarity of the display 199 on showing the image frame 302 according to the clarity setting value. As exemplarily illustrated in FIG. 3, in image frame 302a (i.e., the image frame 302 after being adjusted), the clarity of the region 304a (which corresponds to the predetermined object 304) has been improved. Meanwhile, for the region 3021 which is originally clear in the image frame 302, no unnatural side effect has been introduced in the corresponding region 3021a in the image frame 302a. In this case, when viewing the image 302a, the viewer will not perceive any abnormally sharp region (for example, leaves that are too visually distinct with each other) in the image 302a, and thus feel no weird visual effect.

It can be known from the above that the method proposed by the present disclosure can simultaneously consider the degree of quality reduction of the image frame, the (local and/or global) risk value and the (local and/or global) effect value of the adjustment sharpness, and then dynamically adjust the local or global clarity of the display on showing the image frame. In this way, the adjusted image frame may provide a better image effect, thereby providing a better user experience.

In order to make the mechanism for generating the clarity setting value of the classifying model of the present disclosure more specific, a first embodiment to a fourth embodiment provided in the following will be used as examples for discussions, but the disclosure is not limited thereto.

In the first embodiment, if the considered image frame includes an imagery portion and a predetermined object classified as text, and the proportion of the predetermined object in the image frame is greater than a proportion threshold, the classifying model may define a first clarity setting value corresponding to the predetermined object based on a first dynamic range and define a second clarity setting value corresponding to the imagery portion based on a second dynamic range, wherein the first dynamic range is greater than the second dynamic range. In brief, when there are more text parts in the image frame, the above classifying model can assign a smaller first clarity setting value to the text and a larger second clarity setting value to the imagery portion.

Thereafter, the processor 104 can adjust a first clarity of the display 199 on showing the predetermined object according to the first clarity setting value and adjust a second clarity of the display 199 on showing the imagery portion according to the second clarity setting value. In this way, the predetermined object (i.e., text) which is essentially and relatively sharp will not appear to provide an overly sharp visual effect in the adjusted image frame. Meanwhile, the clarity of the less sharp imagery portion will be improved, and thus a better user experience can be provided.

In the second embodiment, if the risk value is higher than the risk threshold, the classifying model may define a clarity setting value corresponding to the image frame based on the third dynamic range. Conversely, if the risk value is not higher than the risk threshold, the classifying model may define a clarity setting value corresponding to the image frame based on the fourth dynamic range, wherein the third dynamic range is smaller than the fourth dynamic range.

Specifically, after the processor 104 calculates the sharpness (which is characterized as a risk value) of each block in the image frame according to the Equation (3), the classifying model can correspondingly determine whether there are too many blocks whose sharpness is above the risk threshold. If yes, the classifying model can slightly adjust the sharpness of the entire image frame with a smaller clarity setting value. Conversely, if the classifying model determines that there are many blocks whose sharpness are higher than the risk threshold, the classifying model can adjust the sharpness of the entire image frame by a larger clarity setting value. In addition, the processor 104 can also slightly adjust the contrast of the image frame to achieve the effect of complementing the visual clarity.

In the third embodiment, if the first sharpness of the predetermined object is not lower than the sharpness threshold, the classifying model may define a clarity setting value corresponding to the image frame based on the fifth dynamic range. Specifically, when the first sharpness of the predetermined object is not lower than the sharpness threshold, it means that a special image effect (for example, a depth of field effect) may exist in the considered image frame. Therefore, the classifying model can slightly adjust the sharpness of the entire image frame with a small clarity setting value. In addition, the processor 104 can also slightly adjust the contrast of the image frame to achieve the effect of complementing the visual clarity.

In the fourth embodiment, when the considered scenario does not belong to the aforementioned first, second or third embodiment, the classifying model may define a clarity setting value corresponding to the image frame based on the sixth dynamic range, wherein the six dynamic range is greater than the fifth dynamic range. That is, the classifying model can aggressively adjust the sharpness of the entire image frame by a large clarity setting value.

In summary, the method for dynamically adjusting image clarity and the image processing device can consider the degree of quality reduction of the image frame, the (local and/or global) risk value and the (local and/or global) effect value of the adjustment sharpness, and then dynamically adjust the local or global clarity of the display on showing the image frame. In this way, the adjusted image frame may provide a better image effect, thereby providing a better user experience.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A method for dynamically adjusting image clarity, comprising:
   retrieving an image frame and searching for a predetermined object in the image frame;
   evaluating a first sharpness of the predetermined object if the predetermined object exists;
   calculating a difference value between the first sharpness of the predetermined object and a sharpness threshold if the first sharpness of the predetermined object is lower than the sharpness threshold;
   dividing the image frame into a plurality of blocks and evaluating at least one risk value and at least one effect value of increasing a second sharpness of each of the blocks;
   inputting the difference value, the at least one risk value, and the at least one effect value into a classifying model to generate a clarity setting value; and
   adjusting a clarity of a display on showing the image frame based on the clarity setting value.

2. The method for dynamically adjusting image clarity of claim 1, wherein the first sharpness of the predetermined object is:

$$EdgeLV\ AVRG. = \frac{\sum_{EdgeLV1=0}^{255} EdgeLV1 \times PixelCount_{EdgeLV1}}{\sum_{EdgeLV1=0}^{255} PixelCount_{EdgeLV1}},$$

where EdgeLV1 is an edge intensity value, which is between 0 and 255, and PixelCount$_{EdgeLV1}$ is a number of pixels whose edge intensity value is EdgeLV1 in the predetermined object.

3. The method for dynamically adjusting image clarity of claim 1, wherein the at least one risk value comprises a local risk value, wherein the local risk value is:

$$CV2 = \frac{\sum_{EdgeLV2=0}^{255} EdgeLV2 \times PixelCount_{EdgeLV2}}{\sum_{EdgeLV2=0}^{255} PixelCount_{EdgeLV2}},$$

where EdgeLV2 is an edge intensity value, which is between 0 and 255, and PixelCount$_{EdgeLV2}$ is a number of pixels whose edge intensity value is EdgeLV2 in one of the blocks.

4. The method for dynamically adjusting image clarity of claim 1, wherein the at least one risk value comprises a global risk value, wherein the global risk value is:

$$CV3 = \frac{\sum_{EdgeLV3=0}^{255} EdgeLV3 \times PixelCount_{EdgeLV3}}{\sum_{EdgeLV3=0}^{255} PixelCount_{EdgeLV3}},$$

where EdgeLV3 is an edge intensity value, which is between 0 and 255, and PixelCount$_{EdgeLV3}$ is a number of pixels whose edge intensity value is EdgeLV3 in the blocks.

5. The method for dynamically adjusting image clarity of claim 1, wherein the at least one effect value comprises a local effect value, wherein the local effect value is:

$$CV4 = \frac{\sum_{EdgeLV4=1}^{254} EdgeLV4 \times PixelCount_{EdgeLV4}}{\sum_{EdgeLV4=1}^{254} PixelCount_{EdgeLV4}},$$

where EdgeLV4 is an edge intensity value, which is between 0 and 255, and PixelCount$_{EdgeLV4}$ is a number of pixels whose edge intensity value is EdgeLV4 in one of the blocks.

6. The method for dynamically adjusting image clarity of claim 1, wherein the at least one effect value comprises a global effect value, wherein the global effect value is:

$$CV5 = \frac{\sum_{EdgeLV5=1}^{254} EdgeLV5 \times PixelCount_{EdgeLV5}}{\sum_{EdgeLV5=1}^{254} PixelCount_{EdgeLV5}},$$

where EdgeLV5 is an edge intensity value, which is between 0 and 255, and PixelCount$_{EdgeLV5}$ is a number of pixels whose edge intensity value is EdgeLV5 in the blocks.

7. The method for dynamically adjusting image clarity of claim 1, wherein the image frame comprises the predetermined object and a imagery portion, and when the predetermined object is text and a proportion of the text in the image frame is greater than a proportion threshold, the classifying model defines a first clarity setting value corresponding to the predetermined object based on a first dynamic range, and defines a second clarity setting value corresponding to the imagery portion based on a second dynamic range, wherein the first dynamic range is greater than the second dynamic range.

8. The method for dynamically adjusting image clarity according to claim 7, wherein the clarity setting value comprises the first clarity setting value and the second clarity setting value, and the step of adjusting the clarity of the display on showing the image frame based on the clarity setting value comprises:
    adjusting a first clarity of the display on showing the predetermined object according to the first clarity setting value; and
    adjusting a second clarity of the display on showing the imagery portion according to the second clarity setting value.

9. The method for dynamically adjusting image clarity according to claim 1, wherein if the at least one risk value is higher than a risk threshold, the classifying model defines the clarity setting value corresponding to the image frame based on a third dynamic range, and if the at least one risk value is not higher than the risk threshold, the classifying model defines the clarity setting value corresponding to the image frame based on a fourth dynamic range, wherein the third dynamic range is smaller than the fourth dynamic range.

10. The method for dynamically adjusting image clarity according to claim 1, wherein if the first sharpness of the predetermined object is not lower than the sharpness threshold, the classifying model defines the clarity setting value corresponding to the image frame based on a fifth dynamic range.

11. An image processing device, configured to be coupled to a display, comprising:
    a non-transitory storage circuit, storing a plurality of modules;
    a processor, coupled to the non-transitory storage circuit and accessing the modules to perform the following steps:
        retrieving an image frame and searching for a predetermined object in the image frame;
        evaluating a first sharpness of the predetermined object if the predetermined object exists;
        calculating a difference value between the first sharpness of the predetermined object and a sharpness threshold if the first sharpness of the predetermined object is lower than the sharpness threshold;
        dividing the image frame into a plurality of blocks and evaluating at least one risk value and at least one effect value of increasing a second sharpness of each of the blocks;
        inputting the difference value, the at least one risk value, and the at least one effect value into a classifying model to generate a clarity setting value; and
        adjusting a clarity of the display on showing the image frame based on the clarity setting value.

12. The image processing device of claim 11, wherein the first sharpness of the predetermined object is:

$$EdgeLV\ AVRG. = \frac{\sum_{EdgeLV1=0}^{255} EdgeLV1 \times PixelCount_{EdgeLV1}}{\sum_{EdgeLV1=0}^{255} PixelCount_{EdgeLV1}},$$

where EdgeLV1 is an edge intensity value, which is between 0 and 255, and PixelCount$_{EdgeLV1}$ is a number of pixels whose edge intensity value is EdgeLV1 in the predetermined object.

13. The image processing device of claim 11, wherein the at least one risk value comprises a local risk value, wherein the local risk value is:

$$CV2 = \frac{\sum_{EdgeLV2=0}^{255} EdgeLV2 \times PixelCount_{EdgeLV2}}{\sum_{EdgeLV2=0}^{255} PixelCount_{EdgeLV2}},$$

where EdgeLV2 is an edge intensity value, which is between 0 and 255, and PixelCount$_{EdgeLV2}$ is a number of pixels whose edge intensity value is EdgeLV2 in one of the blocks.

14. The image processing device of claim 11, wherein the at least one risk value comprises a global risk value, wherein the global risk value is:

$$CV3 = \frac{\sum_{EdgeLV3=0}^{255} EdgeLV3 \times PixelCount_{EdgeLV3}}{\sum_{EdgeLV3=0}^{255} PixelCount_{EdgeLV3}},$$

where EdgeLV3 is an edge intensity value, which is between 0 and 255, and PixelCount$_{EdgeLV3}$ is a number of pixels whose edge intensity value is EdgeLV3 in the blocks.

15. The image processing device of claim 11, wherein the at least one effect value comprises a local effect value, wherein the local effect value is:

$$CV4 = \frac{\sum_{EdgeLV4=1}^{254} EdgeLV4 \times PixelCount_{EdgeLV4}}{\sum_{EdgeLV4=1}^{254} PixelCount_{EdgeLV4}},$$

where EdgeLV4 is an edge intensity value, which is between 0 and 255, and PixelCount$_{EdgeLV4}$ is a number of pixels whose edge intensity value is EdgeLV4 in one of the blocks.

16. The image processing device of claim 11, wherein the at least one effect value comprises a global effect value, wherein the global effect value is:

$$CV5 = \frac{\sum_{EdgeLV5=1}^{254} EdgeLV5 \times PixelCount_{EdgeLV5}}{\sum_{EdgeLV5=1}^{254} PixelCount_{EdgeLV5}},$$

where EdgeLV5 is an edge intensity value, which is between 0 and 255, and PixelCount$_{EdgeLV5}$ is a number of pixels whose edge intensity value is EdgeLV5 in the blocks.

17. The image processing device of claim 11, wherein the image frame comprises the predetermined object and a imagery portion, and when the predetermined object is text and a proportion of the text in the image frame is greater than a proportion threshold, the classifying model defines a first clarity setting value corresponding to the predetermined object based on a first dynamic range, and defines a second clarity setting value corresponding to the imagery portion based on a second dynamic range, wherein the first dynamic range is greater than the second dynamic range.

18. The image processing device of claim 17, wherein the clarity setting value comprises the first clarity setting value and the second clarity setting value, and the processor is configured to:
adjust a first clarity of the display on showing the predetermined object according to the first clarity setting value; and
adjust a second clarity of the display on showing the imagery portion according to the second clarity setting value.

19. The image processing device of claim 11, wherein if the at least one risk value is higher than a risk threshold, the classifying model defines the clarity setting value corresponding to the image frame based on a third dynamic range, and if the at least one risk value is not higher than the risk threshold, the classifying model defines the clarity setting value corresponding to the image frame based on a fourth dynamic range, wherein the third dynamic range is smaller than the fourth dynamic range.

20. The image processing device of claim 11, wherein if the first sharpness of the predetermined object is not lower than the sharpness threshold, the classifying model defines the clarity setting value corresponding to the image frame based on a fifth dynamic range.

* * * * *